(12) United States Patent
Schmidt et al.

(10) Patent No.: US 11,659,476 B2
(45) Date of Patent: *May 23, 2023

(54) PROTECTING PHYSICAL CELL IDENTIFIERS

(71) Applicant: Verizon Patent and Licensing Inc., Basking Ridge, NJ (US)

(72) Inventors: Christopher M. Schmidt, Branchburg, NJ (US); Lily Zhu, Parsippany, NJ (US); Abhishek Rajendrakumar Panchal, Wallington, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 60 days.

This patent is subject to a terminal disclaimer.

(21) Appl. No.: 17/302,940

(22) Filed: May 17, 2021

(65) Prior Publication Data

US 2021/0274430 A1 Sep. 2, 2021

Related U.S. Application Data

(63) Continuation of application No. 16/703,247, filed on Dec. 4, 2019, now Pat. No. 11,026,156, which is a continuation of application No. 15/940,261, filed on Mar. 29, 2018, now Pat. No. 10,524,193.

(51) Int. Cl.
| | |
|---|---|
| *H04W 40/10* | (2009.01) |
| *H04W 48/10* | (2009.01) |
| *H04W 4/06* | (2009.01) |
| H04W 4/02 | (2018.01) |
| H04W 88/08 | (2009.01) |

(52) U.S. Cl.
CPC ............ *H04W 48/10* (2013.01); *H04W 4/06* (2013.01); *H04W 4/023* (2013.01); *H04W 88/08* (2013.01)

(58) Field of Classification Search
CPC ....... H04W 4/023; H04W 4/06; H04W 48/10; H04W 4/021; H04W 48/12; H04W 88/08
See application file for complete search history.

(56) References Cited

U.S. PATENT DOCUMENTS

| | | | |
|---|---|---|---|
| 9,867,109 B1 | 1/2018 | Parihar et al. | |
| 10,841,302 B2* | 11/2020 | Hahn | ................. H04L 63/0869 |
| 2012/0039233 A1 | 2/2012 | Kim et al. | |
| 2012/0178490 A1 | 7/2012 | Jain et al. | |
| 2013/0172031 A1 | 7/2013 | Calippe et al. | |
| 2014/0080468 A1 | 3/2014 | Zhang et al. | |
| 2014/0222900 A1* | 8/2014 | Todd | ..................... H04L 67/568 |
| | | | 709/203 |
| 2016/0044576 A1 | 2/2016 | Hahn et al. | |
| 2017/0353913 A1 | 12/2017 | Sun et al. | |

* cited by examiner

*Primary Examiner* — Phuc H Tran

(57) ABSTRACT

A base station device broadcasts a base station identifier. The base station identifier is assigned to the base station device, and is broadcasted in one or more system information messages that are receivable by user devices located within a threshold distance from the base station device. The base station device determines whether the base station identifier is to be altered, and processes the base station identifier to generate an altered base station identifier for the base station device. The base station device performs one or more actions to cause the altered base station identifier to be broadcasted. The altered base station identifier is broadcasted in one or more additional system information messages that are receivable by the user devices.

20 Claims, 8 Drawing Sheets

PROTECTING PHYSICAL CELL IDENTIFIERS

RELATED APPLICATIONS

This application is a continuation of U.S. patent application Ser. No. 16/703,247, entitled "PROTECTING PHYSICAL CELL IDENTIFIERS," filed Dec. 4, 2019 (now U.S. Pat. No. 11,026,156), which is a continuation of U.S. patent application Ser. No. 15/940,261, entitled "PROTECTING PHYSICAL CELL IDENTIFIERS," filed Mar. 29, 2018 (now U.S. Pat. No. 10,524,193), which are incorporated herein by reference in their entireties.

BACKGROUND

In a wireless network, a network provider's base station typically broadcasts (e.g., in a system information message according to $3^{rd}$ Generation Partnership Project (3GPP) standards) a physical cell identifier (PCI) associated with the base station. The PCI is a static identifier that is assigned to the base station, and is proprietary to the network provider. A user device can receive and utilize the PCI for various network-related procedures, such as cell searching and handovers (e.g., inter-radio access technology (inter-RAT) handovers, inter-frequency and intra-frequency handovers, and/or the like), and even location-based services. In many cases, a user device can identify the PCI each time the user device powers on and/or each time the user device engages in a handover. In the context of a location-based service provided by a location-based server (e.g., relating to an over-the-top service provider), a user device can report the PCI of a serving base station or cell, and PCIs of neighboring base stations or cells, along with various measurements (e.g., measurements relating to a Long-Term Evolution (LTE) network, including measurements relating to Reference Signal Received Power (RSRP), Reference Signal Received Quality (RSRQ), Timing Advance (TADV), and/or the like) to the location-based server, which the location-based server can use to determine a location or position of the user device.

DETAILED DESCRIPTION OF PREFERRED EMBODIMENTS

Figure 1A:
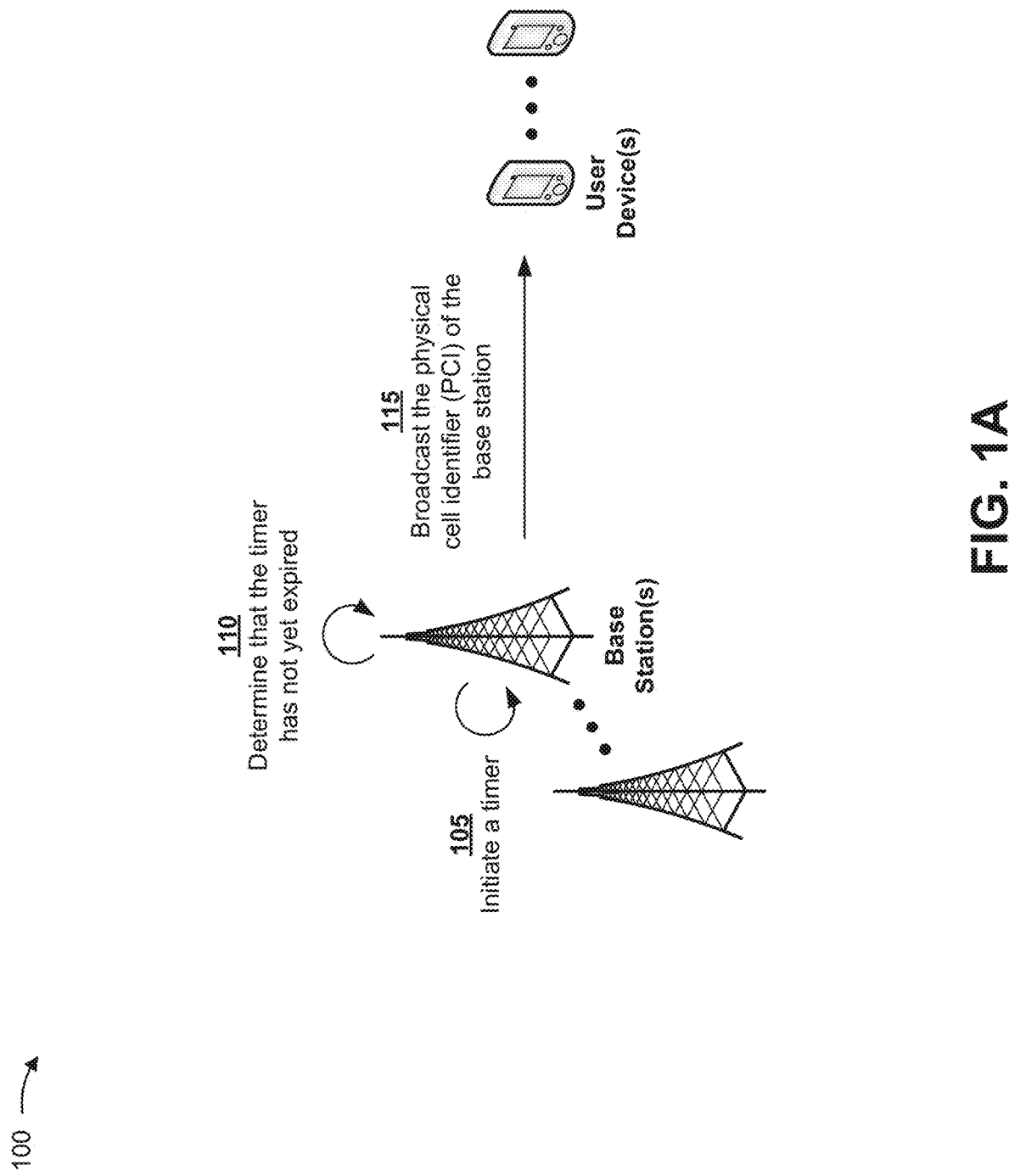
FIGS. 1A-1D are diagrams of an overview of an example implementation described herein.

The following detailed description of example implementations refers to the accompanying drawings. The same reference numbers in different drawings can identify the same or similar elements.

Third-party location-based service providers typically crowdsource a network provider's PCIs to facilitate the provision of the third-party providers' own location-based services. For example, a user of a user device can opt to share the user's location or position with a third-party provider. In this case, the user device provides (e.g., at power on, during a handover, and/or the like), to the third-party provider (e.g., to a location-based server of the third-party provider), the PCI of a network provider's serving base station or cell, any Wi-Fi information, any LTE-related measurements, any global positioning system (GPS) measurements, and/or the like. The third-party provider can aggregate such information in a database, and analyze the information to associate, with each PCI, an estimated coarse position of the corresponding serving base station or cell. Later, when a location-based service application (e.g., provided by the third-party provider and installed in a user device) submits a request to the third-party provider—e.g., via a query that includes the serving base station's PCI—to determine a position of the user device, the third-party provider can perform a lookup of the PCI in the database to determine a coarse position of the user device. As such, a third-party provider can leverage a network provider's PCIs for the third-party provider's own purposes.

Some implementations, described herein, provide a base station (e.g., a base station device, such as a device included in an Evolved Node B (eNodeB or eNB)) that is capable of limiting or restricting the ability of a third-party provider of location-based services to determine (e.g., via analysis of crowdsourced PCIs) position information relating to the base station, and thus limiting or restricting the ability of the third-party provider to leverage such position information for the third-party provider's own purposes without a network provider's permission. In some implementations, the base station can periodically alter the PCI of the base station, which can deter a third-party provider's reliance on PCIs to determine coarse positions of serving base stations or cells. In some implementations, the network provider's own location-based service server (e.g., server device) can include a base station almanac data structure (e.g., a file, a list, an array, a stack, a queue, a tree, and/or the like) that associates each of the network provider's base stations with a corresponding PCI, and can periodically update the base station almanac data structure in synchrony with PCI alterations performed by the base stations. In this way, a network provider can maintain control of the network provider's PCIs, and utilize the PCIs for the network provider's own purposes, such as to facilitate the provision of the network provider's own location-based services, which permits the network provider to ensure that high quality location-based services are provided to users.

Figure 1B:
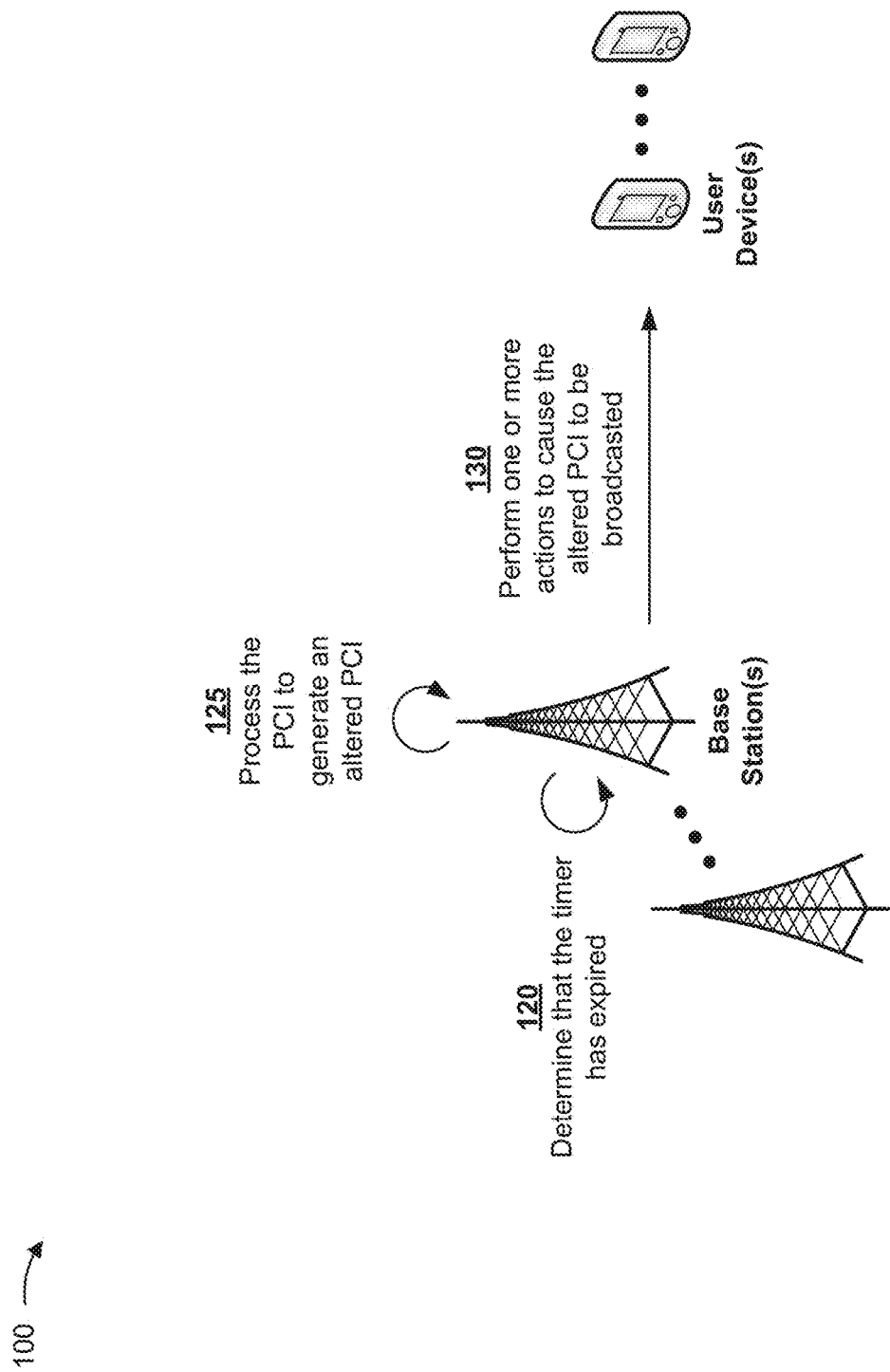

FIGS. 1A-1D are diagrams of an overview of an example implementation 100 described herein. As shown in FIGS. 1A and 1B, example implementation 100 can include one or more base stations associated with a network provider, and one or more user devices in communication with the one or more base stations. Although example implementation 100 is generally described herein as involving actions or steps that are performed by an individual base station, each of multiple base stations can perform the same or similar actions or steps.

In some implementations, each base station can be associated with (e.g., assigned) a base station identifier—a PCI, and can include one or more applications (e.g., implemented in hardware (e.g., including one or more logic circuits and/or components), firmware, or a combination of hardware and software) configured to periodically generate an altered PCI.

As shown in FIG. 1A, and as shown by reference number 105, a base station can initiate a timer. The time interval of the timer can be set based on a periodicity or frequency at which an altered PCI is to be generated (e.g., the time interval can be set to 120 days, 30 days, 7 days, 12 hours, 6 hours, 2 hours, and/or the like). As shown by reference number 110, the base station can determine that the timer has not yet expired. As shown by reference number 115, the base station can broadcast the PCI of the base station (e.g., in system information block (SIB) message(s)). For example, the base station can broadcast the PCI such that, when a user device powers on while located within an area served by the base station (e.g., within a threshold distance from the base station), when the user device is engaged in a handover, and/or the like, the user device can receive the PCI of the base station.

As shown in FIG. 1B, and as shown by reference number 120, the base station can determine that the timer has expired. As shown by reference number 125 (e.g., upon determining that the timer has expired), the base station can process the PCI (e.g., a value of the PCI) to generate an altered PCI (e.g., a PCI that has a different value). The base station can perform any operation suitable to generate an altered PCI, such as adding a value to the PCI, subtracting a value from the PCI, multiplying the PCI by a value, dividing the PCI by a value, and/or the like. For example, the base station can generate an altered PCI by adding a value of 8 to the value of the PCI. In some implementations, upon processing the PCI, or after processing the PCI, the base station can reinitiate the timer (e.g., for purposes of further altering the altered PCI).

As shown by reference number 130, the base station can perform one or more actions to cause the altered PCI to be broadcasted (e.g., in one or more additional SIB messages).

In this way, even if a base station's PCI is crowdsourced by a third party, frequent alteration of the PCI by the base station can restrict or limit the ability of the third party to utilize the PCI for the third party's own purposes.

In some implementations, each of a network provider's base stations can periodically alter that base station's PCI. In some implementations, multiple base stations can alter the respective PCIs in the same or a similar manner (e.g., by initiating respective timers at the same time (or at nearly the same time), processing the respective PCIs using the same or similar operation(s), processing the respective PCIs at the same time (or at nearly the same time), and/or the like).

In some implementations, a base station can periodically change the value of the timer so as to prevent a third-party provider from figuring out when PCI alterations are being made and taking action to crowdsource new PCI values.

Figure 1C:
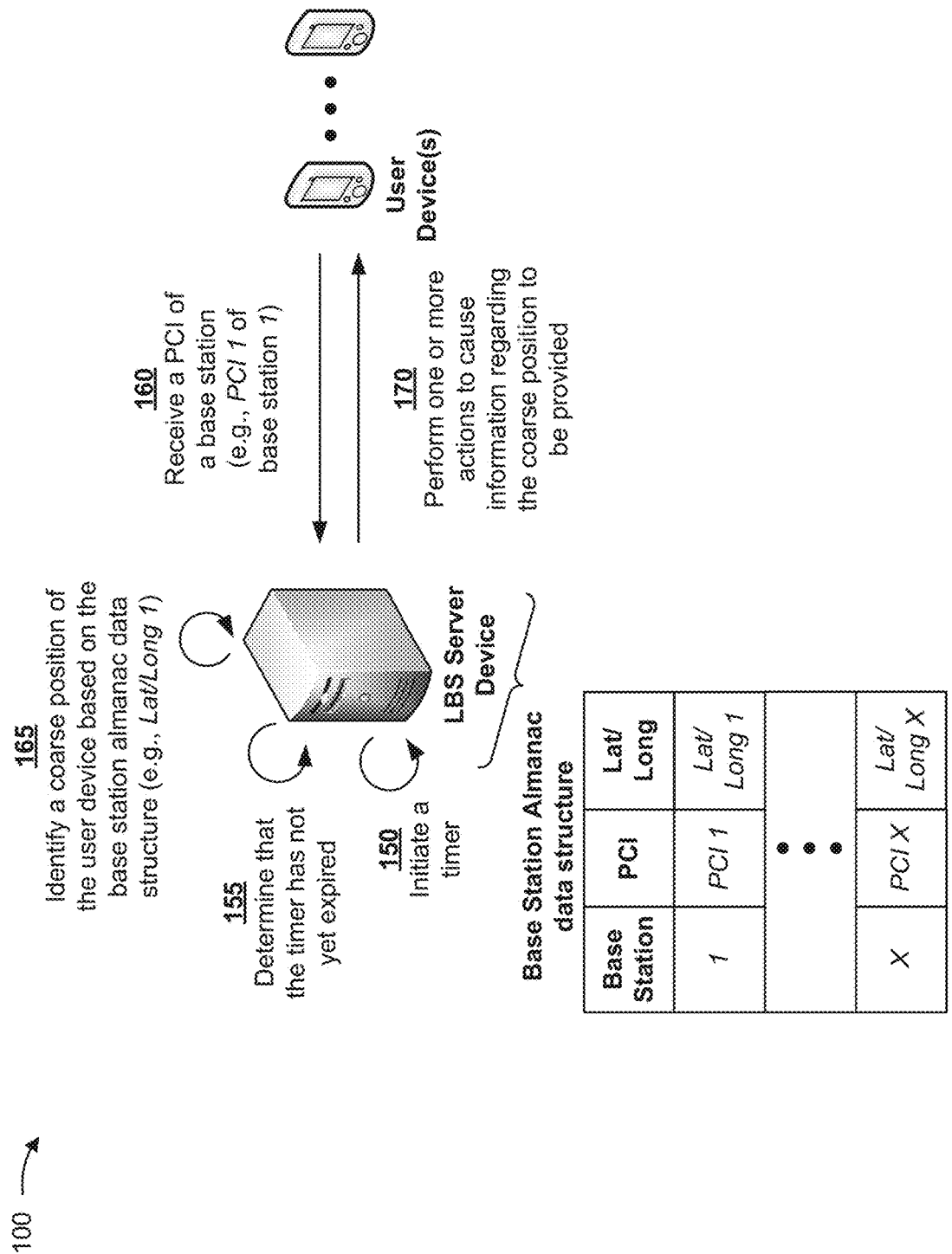
Figure 1D:
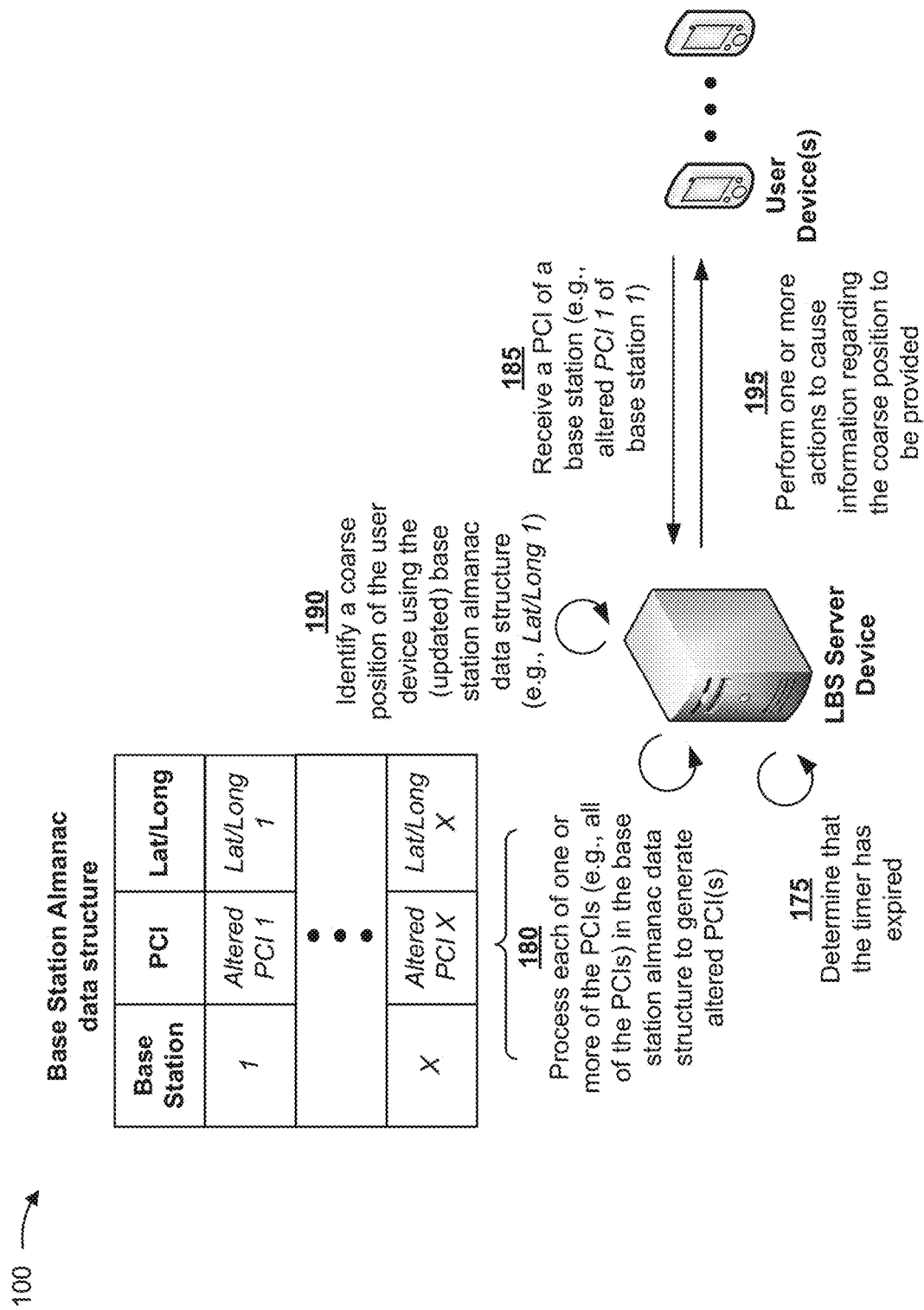

As shown in FIGS. 1C and 1D, example implementation 100 can additionally include a location-based service (LBS) server device, and one or more user devices in communication with the LBS server device. In some implementations, the LBS server device can be provided by and/or controlled by the network provider. Additionally, or alternatively, the LBS server device can be associated with a third party that is authorized by the network provider to utilize the network provider's PCIs. In some implementations, the LBS server device can be associated with the base station(s) described above with respect to FIGS. 1A and 1B. Although example implementation 100, of FIGS. 1C and 1D, is generally described herein as involving actions or steps that are performed by an individual LBS server device, each of multiple LBS server devices can perform the same or similar actions or steps.

As shown in FIGS. 1C and 1D, the LBS server device can store and/or have access to a base station almanac data structure that includes information regarding one or more base station(s) (e.g., base station 1 through base station X), such as the base station(s) described above with respect to FIGS. 1A and 1B. The information can include position information, such as latitude and/or longitude coordinates (e.g., "ground truth" information), base station identifiers (e.g., base station identifier values, such as PCI values), and/or the like.

As shown in FIG. 1C, and as shown by reference number 150, the LBS server device can initiate a timer—e.g., the same timer (having the same time interval) that is initiated by a base station, such as that described above with respect to reference number 105. In some implementations, the LBS server device can initiate the timer at the same time (or at nearly the same time) that the base station initiates the timer. In some implementations, and in a case where the base station periodically changes the value of the timer (e.g., so as to prevent a third-party provider from figuring out when PCI alterations are being made and taking action to crowdsource new PCI values, as described above with respect to FIGS. 1A and 1B), the LBS server device can change the value of the timer accordingly, such that a time of expiration of the timer at the base station always matches a time of expiration of a corresponding timer at the LBS server device.

As shown by reference number 155, the LBS server device can determine that the timer has not yet expired. As shown by reference number 160, the LBS server device can receive a PCI of a base station (e.g., PCI 1 of base station 1) from a user device. For example, the LBS server device can receive the PCI as part of a request for location-based services provided by the LBS server device, such as part of a request to determine a position (e.g., an approximate or coarse location) of the user device. As shown by reference number 165, the LBS server device can identify a coarse position of the user device based on the base station almanac data structure. For example, in a case where the LBS server device receives PCI 1 from the user device, the LBS server device can identify Lat/Long 1 as a coarse position of the user device by performing a lookup of PCI 1 in the base station almanac data structure. As shown by reference number 170, the LBS server device can perform one or more actions to cause information regarding the coarse position to be provided to the user device.

As shown in FIG. 1D, and as shown by reference number 175, the LBS server device can determine that the timer has expired. As shown by reference number 180, the LBS server device can process each of one or more of the PCIs (e.g., all of the PCIs) in the base station almanac data structure to generate altered PCIs. In some implementations, the LBS server device can generate an altered PCI by performing the same operation(s) that are performed by a corresponding base station, such as that described above with respect to reference number 125. For example, in a case where base station 1 performs the actions or steps described above with respect to FIGS. 1A and 1B, the LBS server device can perform the same operation(s), described above with respect to reference number 125, to process PCI 1 to generate an altered PCI (such that the value of the altered PCI generated by the LBS server device is the same as the value of the altered PCI generated by base station 1). Further continuing the example, in a case where each of multiple base stations (e.g., base station 1 to base station X) performs the actions or steps described above with respect to FIGS. 1A and 1B, the LBS server device can perform the same operation(s), that are performed by each individual base station, to generate altered PCIs that match the altered PCIs generated by the respective base stations. This can ensure that, when a base station alters the base station's PCI, the LBS server device can simultaneously (or near simultaneously) perform the same alteration procedure (e.g., in synchrony with the base station), and update the base station almanac data structure accordingly.

As shown by reference number 185, the LBS server device can receive a PCI of a base station (e.g., altered PCI 1 of base station 1) from a user device. As shown by reference number 190, the LBS server device can identify a coarse position of the user device based on the (updated) base station almanac data structure. For example, in a case where the LBS server device receives altered PCI 1 from the user device, the LBS server device can identify Lat/Long 1 as a coarse position of the user device by performing a lookup of altered PCI 1 in the base station almanac data structure. As shown by reference number 195, the LBS server device can perform one or more actions to cause information regarding the coarse position to be provided to the user device.

In this way, a network provider can maintain control of the network provider's PCIs, and utilize the PCIs for the network provider's own purposes, such as to facilitate the provision of the network provider's own location-based services, which permits the network provider to ensure that high quality location-based services are provided to users.

As indicated above, FIGS. 1A-1D are provided merely an examples. Other examples are possible and can differ from what was described with regard to FIGS. 1A-1D. Although some implementations are described herein with respect to base station identifiers, such as PCIs, the implementations can apply equally or similarly to other types of wireless network provider information, such as Wi-Fi identifier information associated with wireless local area networks. In addition, in some implementations, a base station can encrypt a base station identifier to further protect the base station identifier. Furthermore, although some implementations are described herein with respect to an LBS server device that is capable of processing a base station identifier (e.g., a PCI) in synchrony with the processing of the base station identifier by a corresponding base station, in some implementations, a base station can alternatively provide altered base station identifiers to the LBS server device. For example, upon or after generating each altered base station identifier, the base station can provide (e.g., via one or more external devices) the altered base station identifier to the LBS server device. In this case, the LBS server device can receive up-to-date base station identifier values (and leverage the updates to facilitate the provision of location-based services) without needing to perform the various actions or steps described above with respect to FIGS. 1C and 1D.

Figure 2:
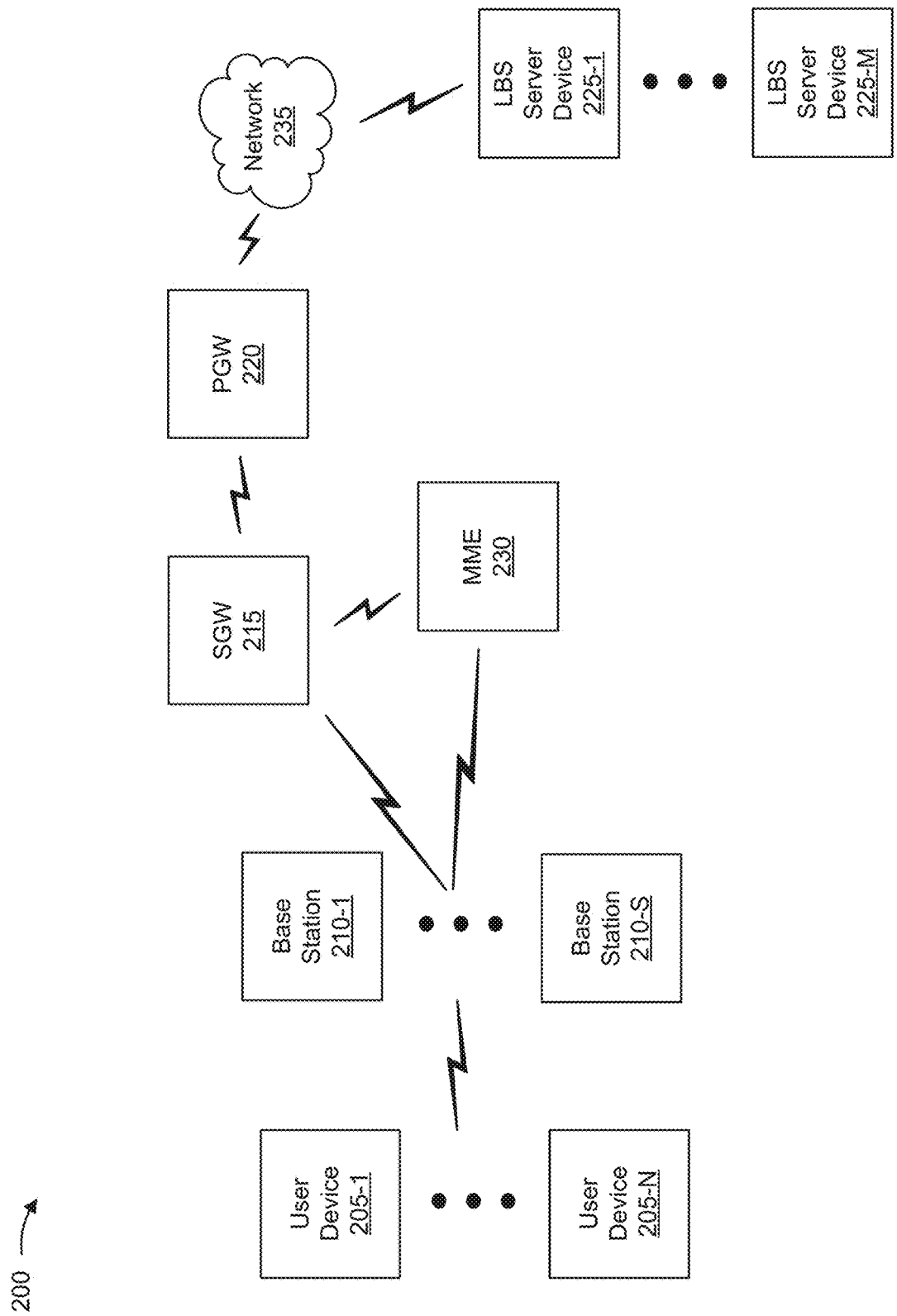
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include one or more user devices 205-1 through 205-N (N≥1) (hereinafter referred to collectively as "user devices 205," and individually as "user device 205"), one or more base stations (or base station devices) 210-1 through 210-S (S≥1) (hereinafter referred to collectively as "base stations 210," and individually as "base station 210"), a serving gateway (SGW) 215, a packet data-network gateway (PGW) 220, one or more LBS server devices 225-1 through 225-M (M≥1) (hereinafter referred to collectively as "LBS server device 225," and individually as "LBS server device 225"), a mobility management entity device (MME) 230, and/or a network 235. Devices of environment 200 can interconnect via wired connections, wireless connections, or a combination of wired and wireless connections.

User device 205 includes one or more devices capable of communicating with base station 210 and/or a network (e.g., network 235). For example, user device 205 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, and/or a similar device. User device 205 can send traffic to and/or receive traffic from network 235 (e.g., via base station 210, SGW 215, and/or PGW 220).

Base station 210 includes one or more devices capable of transferring traffic, such as audio, video, text, and/or other traffic, destined for and/or received from user device 205. In some implementations, base station 210 can include an eNodeB associated with an LTE network that receives traffic from and/or sends traffic to network 235 via SGW 215 and/or PGW 220. Additionally, or alternatively, one or more base stations 210 can be associated with a radio access network (RAN) that is not associated with the LTE network. Base station 210 can send traffic to and/or receive traffic from user device 205 via an air interface. In some implementations, base station 210 can include a small cell base station, such as a base station of a microcell, a picocell, and/or a femtocell. In some implementations, base station 210 can alter (e.g., periodically) a base station identifier (e.g., a PCI) of base station 210, as described elsewhere herein.

SGW 215 includes one or more devices capable of routing packets. For example, SGW 215 can include a traffic transfer device, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 215 can aggregate traffic received from one or more base stations 210 associated with the LTE network, and can send the aggregated traffic to network 235 (e.g., via PGW 220) and/or other network devices associated with an evolved packet core (EPC) and/or an Internet Protocol Multimedia Subsystem (IMS) core. SGW 215 can also receive traffic from network 235 and/or other network devices, and can send the traffic to user device 205 via base station 210. Additionally, or alternatively, SGW 215 can perform operations associated with handing off user device 205 to and/or from an LTE network.

PGW 220 includes one or more devices capable of providing connectivity for user device 205 to external packet data networks. For example, PGW 220 can include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 220 can aggregate traffic received from one or more SGWs 215, and can send the aggregated traffic to network 235. Additionally, or alternatively, PGW 220 can receive traffic from network 235, and can send the traffic to user device 205 via SGW 215 and base station 210. PGW 220 can record data usage information (e.g., byte usage).

LBS server device 225 includes one or more devices (e.g., web server device(s), proxy server device(s), network device(s), or similar device(s)) capable of receiving, storing, providing, generating, and/or processing information associated with base station 210 and/or user device 205. For example, LBS server device 225 can include a server device or a group of server devices (e.g., associated with a multi-server micro data center), a workstation computer or a group of workstation computers, a virtual machine (VM) or a group of virtual machines (VMs) implemented by one or more computing devices provided in a cloud computing environment, or a similar type or group of devices. In some implementations, LBS server device 225 can store and/or maintain a base station almanac data structure that contains base station identifiers assigned to respective base stations (e.g., base stations 210), and can alter (e.g., periodically) the base station identifiers, as described elsewhere herein.

MME 230 includes one or more devices, such as one or more server devices, capable of managing authentication, activation, deactivation, and/or mobility functions associated with user device 205. In some implementations, MME 230 can perform operations relating to authentication of user device 205. Additionally, or alternatively, MME 230 can facilitate the selection of a particular SGW 215 and/or a particular PGW 220 to serve traffic to and/or from user device 205. MME 230 can perform operations associated with handing off user device 205 from a first base station 210 to a second base station 210 when user device 205 is transitioning from a first cell associated with the first base station 210 to a second cell associated with the second base station 210. Additionally, or alternatively, MME 230 can select another MME (not pictured), to which user device 205 should be handed off (e.g., when user device 205 moves out of range of MME 230).

Network 235 includes one or more wired and/or wireless networks. For example, network 235 can include a cellular network (e.g., an LTE network, a 3G network, a code division multiple access (CDMA) network, etc.), a public land user network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
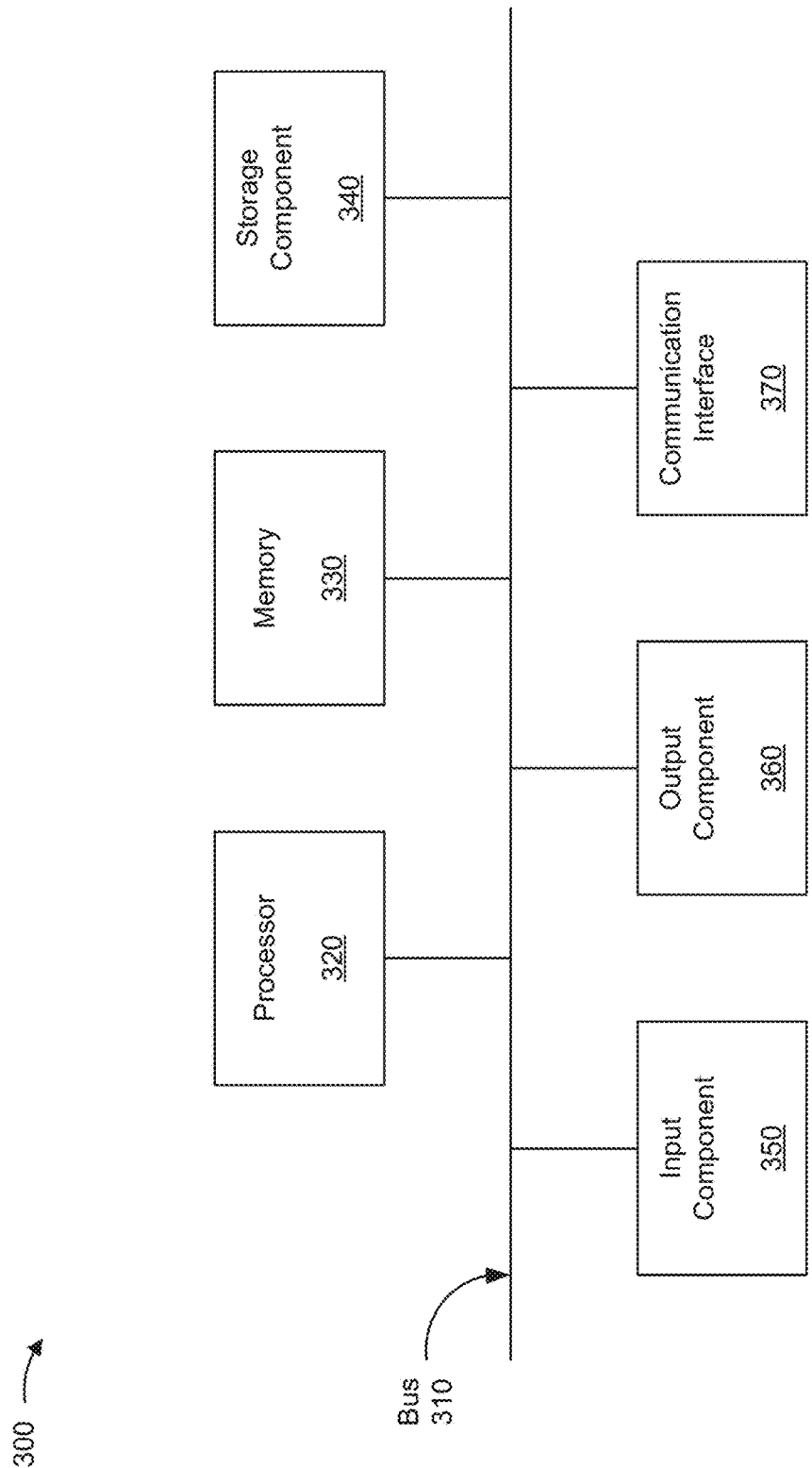
FIG. 3 is a diagram of example components of one or more devices of FIG. 2.

FIG. 3 is a diagram of example components of a device 300. Device 300 can correspond to user device 205, base station 210, SGW 215, PGW 220, LBS server device 225, and/or MME 230. In some implementations, user device 205, base station 210, SGW 215, PGW 220, LBS server device 225, and/or MME 230 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 can include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 can include one or more processors capable of being programmed to perform a function. Memory 330 can include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 includes a component that permits device 300 to receive information, such as via user input (e.g., a touch screen display, a keyboard, a keypad, a mouse, a button, a switch, a microphone, etc.). Additionally, or alternatively, input component 350 can include a sensor for sensing information (e.g., a GPS component, an accelerometer, a gyroscope, an actuator, etc.). Output component 360 can include a component that provides output information from device 300 (e.g., a display, a speaker, one or more light-emitting diodes (LEDs), etc.).

Communication interface 370 includes a transceiver-like component (e.g., a transceiver, a separate receiver and transmitter, etc.) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, and/or the like.

Device 300 can perform one or more processes described herein. Device 300 can perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
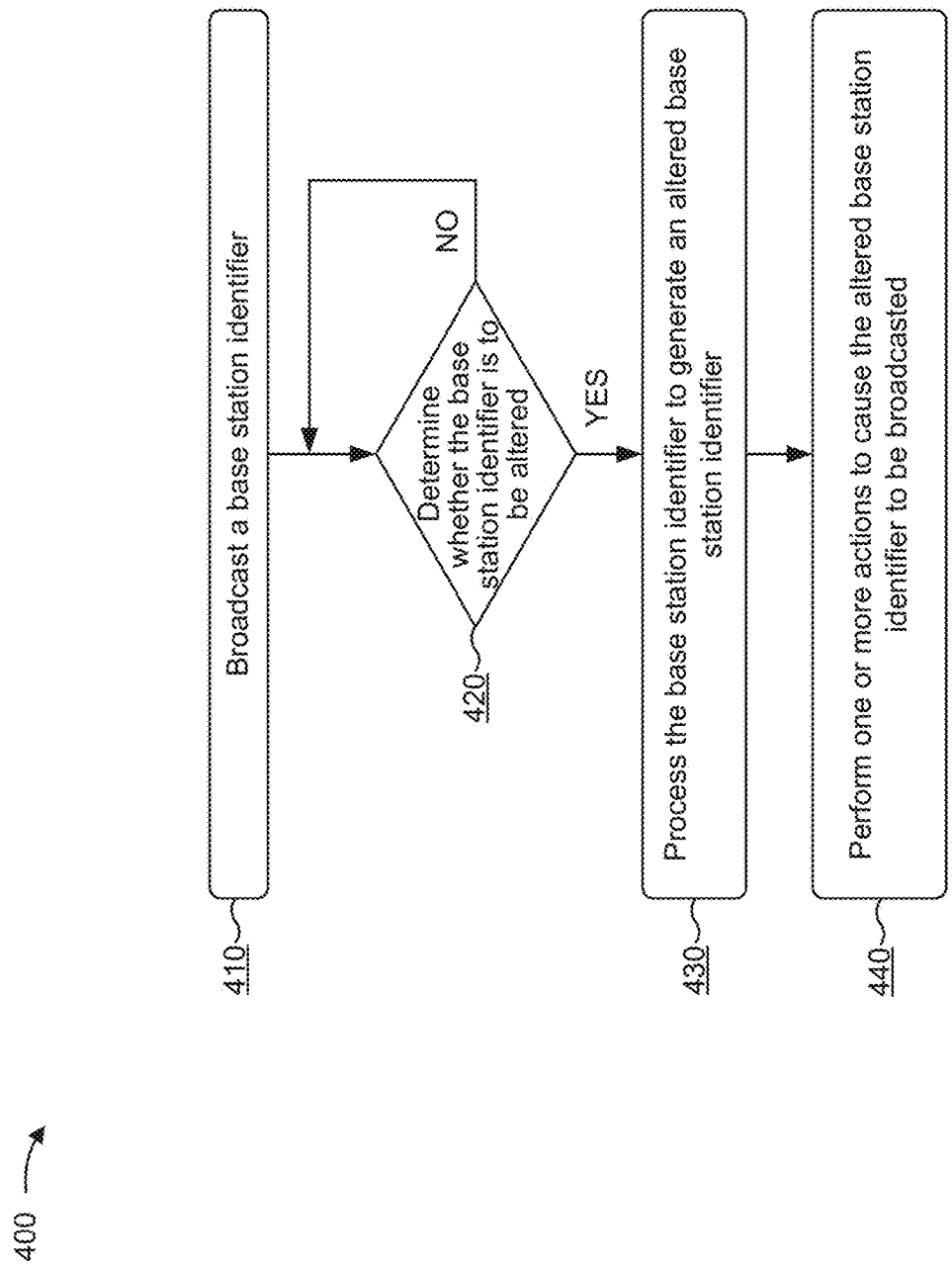
FIG. 4 is a flow chart of an example process for protecting a physical cell identifier.

FIG. 4 is a flow chart of an example process 400 for protecting a physical cell identifier. In some implementations, one or more process blocks of FIG. 4 can be performed by base station 210. In some implementations, one or more process blocks of FIG. 4 can be performed by another device or a group of devices separate from or including base station 210, such as user device 205, SGW 215, PGW 220, LBS server device 225, and/or MME 230.

As shown in FIG. 4, process 400 can include broadcasting a base station identifier (block 410). For example, base station 210 (e.g., using processor 320, memory 330, storage component 340, communication interface 370, and/or the like) can broadcast a base station identifier.

In some implementations, base station 210 can be associated with a network provider, and be configured to communicate with user devices (e.g., user devices 205) located with a cell associated with base station 210.

In some implementations, base station 210 can be associated with (e.g., assigned) a base station identifier—a PCI, and can include one or more applications (e.g., implemented in hardware (e.g., including one or more logic circuits and/or components), firmware, or a combination of hardware and software) configured to periodically generate an altered base station identifier.

In some implementations, base station 210 can broadcast the base station identifier in a manner that is the same as or similar to that described above with respect to FIGS. 1A and 1B. For example, base station 210 can broadcast the base station identifier such that, when user device 205 powers on while located within an area served by base station 210, user device 205 can receive the base station identifier.

In this way, base station 210 can broadcast a base station identifier, which can enable base station 210 to determine whether the base station identifier is to be altered.

As further shown in FIG. 4, process 400 can include determining whether the base station identifier is to be altered (block 420). For example, base station 210 (e.g., using processor 320, memory 330, storage component 340, and/or the like) can determine whether the base station identifier (e.g., a value of the base station identifier, such as a value of the PCI) is to be altered.

In some implementations, base station 210 can determine whether the base station identifier is to be altered in a manner that is the same as or similar to that described above with respect to FIGS. 1A and 1B. For example, in some implementations, base station 210 can initiate a timer. The time interval of the timer can be set based on a periodicity or frequency at which an altered base station identifier is to be generated, such as 120 days, 30 days, 7 days, 12 hours, 6 hours, 2 hours, and/or the like. In some implementations, base station 210 can determine whether the base station identifier is to be altered based on an expiration of the timer.

In this way, base station 210 can determine whether the base station identifier is to be altered, which can enable base station 210 to process the base station identifier to generate an altered base station identifier.

As further shown in FIG. 4, if the base station identifier is not to be altered (block 420—NO), process 400 can return to block 420 described above. In this case, base station 210 can continue to wait (and, for example, continue to provide the base station identifier to user devices (e.g., user devices 205) upon request).

As further shown in FIG. 4, if the base station identifier is to be altered (block 420—YES), process 400 can include processing the base station identifier to generate an altered base station identifier (block 430). For example, base station 210 (e.g., using processor 320 and/or the like) can process the base station identifier to generate an altered base station identifier.

In some implementations, base station 210 can process the base station identifier to generate an altered base station identifier in a manner that is the same as or similar to that described above with respect to FIGS. 1A and 1B. In some implementations, base station 210 can perform any suitable operation(s) to generate an altered base station identifier so long as a value of the base station identifier is adjusted.

For example, base station 210 can add a value to the base station identifier, subtract a value from the base station identifier, multiply the base station identifier by a value, divide the base station identifier by a value, and/or the like. For example, the base station can generate an altered PCI by subtracting a whole number or a fraction from the value of the base station identifier.

In some implementations, upon processing the base station identifier, or after processing the base station identifier, base station 210 can reinitiate the timer, and repeat the process. For example, base station 210 can reinitiate the timer, and process the altered base station identifier again after the reinitiated timer expires.

In this way, base station 210 can process the base station identifier to generate an altered base station identifier, which can enable base station 210 to perform one or more actions to cause the altered base station identifier to be broadcasted.

As further shown in FIG. 4, process 400 can include performing one or more actions to cause the altered base station identifier to be broadcasted (block 440). For example, base station 210 (e.g., using processor 320, memory 330, storage component 340, communication interface 370, and/or the like) can perform one or more actions to cause the altered base station identifier to be broadcasted.

In some implementations, base station 210 can perform one or more actions to cause the altered base station identifier to be broadcasted in a manner that is the same as or similar to that described above with respect to FIGS. 1A and 1B.

In some implementations, the one or more actions can include obtaining the altered base station identifier (e.g., from memory in base station 210), including the altered base station identifier in a system information message, and providing the system information message over an air interface.

In this way, base station 210 can perform one or more actions to cause the altered base station identifier to be broadcasted.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Although process 400 is generally described herein as involving actions or steps that are performed by an individual base station 210, each of multiple base stations 210 can perform the same or similar actions or steps.

Figure 5:
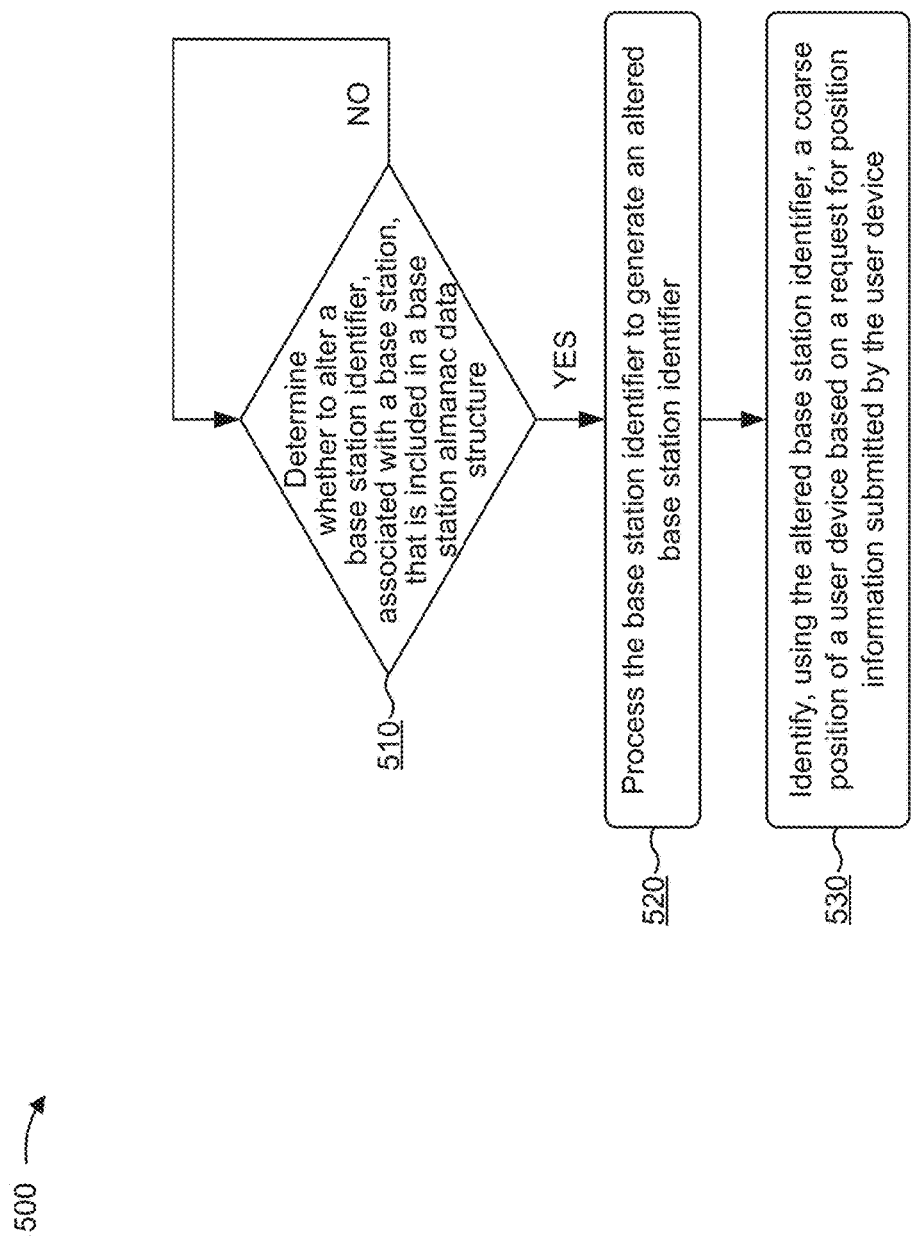
FIG. 5 is a flow chart of an example process relating to the example process shown in FIG. 4.

FIG. 5 is a flow chart of an example process 500 relating to example process 400 shown in FIG. 4. In some implementations, one or more process blocks of FIG. 5 can be performed by LBS server device 225. In some implementations, one or more process blocks of FIG. 5 can be performed by another device or a group of devices separate from or including LBS server device 225, such as user device 205, base station 210, SGW 215, PGW 220, and/or MME 230.

As shown in FIG. 5, process 500 can include determining whether to alter a base station identifier, associated with a base station, that is included in a base station almanac data structure (block 510). For example, LBS server device 225 (e.g., using processor 320, memory 330, storage component 340, and/or the like) can determine whether to alter a base station identifier, associated with a base station 210, that is included in a base station almanac data structure. In some implementations, LBS server device 225 can determine whether to alter a base station identifier (e.g., a value of the base station identifier) in a manner that is the same as or similar to that described above with respect to FIGS. 1C and 1D.

In some implementations, LBS server device 225 can be provided by and/or controlled by a network provider (e.g., a network provider associated with base station 210). Additionally, or alternatively, LBS server device 225 can be associated with a third party that is authorized by the network provider to utilize the network provider's base station identifiers (e.g., PCIs).

In some implementations, LBS server device 225 can initiate a timer in synchrony with the initiation of a corresponding timer by a base station 210 associated with the base station identifier, and determine whether the timer has expired, as described elsewhere herein.

In this way, LBS server device 225 can determine whether to alter a base station identifier, associated with a base station, that is included in a base station almanac data structure, which can enable LBS server device 225 to process the base station identifier to generate an altered base station identifier.

As further shown in FIG. 5, if the base station identifier is not to be altered (block 510—NO), process 500 can return to block 510 described above. In this case, LBS server device 225 can continue to use the base station identifier associated with base station 210 to determine locations (e.g., coarse positions) of user devices in connection with location-based services, as needed.

As further shown in FIG. 5, if the base station identifier is to be altered (block 510—YES), process 500 can include processing the base station identifier to generate an altered base station identifier (block 520). For example, LBS server device 225 (e.g., using processor 320 and/or the like) can process the base station identifier to generate an altered base station identifier.

In some implementations, LBS server device 225 can process the base station identifier to generate an altered base station identifier in a manner that is the same as or similar to that described above with respect to FIGS. 1C and 1D. In some implementations, LBS server device 225 can perform any operation suitable to generate an altered base station identifier, so long as the altered base station identifier matches an altered base station identifier that is generated by the corresponding base station (e.g., base station 210). In some implementations, LBS server device 225 can update the base station almanac data structure with the altered base station identifier.

In some implementations, upon processing the base station identifier, or after processing the base station identifier, LBS server device 225 can reinitiate the timer (e.g., for purposes of further altering the altered base station identifier).

In this way, LBS server device 225 can process the base station identifier to generate an altered base station identifier, which can enable LBS server device 225 to identify, using the altered base station identifier, a coarse position of a user device based on a request for position information submitted by the user device.

As further shown in FIG. 5, process 500 can include identifying, using the altered base station identifier, a coarse position of a user device based on a request for position information submitted by the user device (block 530). For example, LBS server device 225 (e.g., using processor 320 and/or the like) can identify, using the altered base station identifier, a coarse position of a user device 205 based on a request for position information submitted by the user device 205. In practice, LBS server device 225 can identify coarse positions of thousands, millions, billions, etc. of user devices. In this way, LBS server device 225 can identify coarse positions of user devices in a manner that cannot be performed manually or objectively by a human actor.

In some implementations, LBS server device 225 can identify the coarse position of a user device 205 in a manner that is the same as or similar to that described above with respect to FIGS. 1C and 1D.

In some implementations, LBS server device 225 can receive, from the user device 205, a request that includes a base station identifier (that the user device 205 received from a corresponding base station 210) that matches the altered base station identifier generated by LBS server device 225. In this case, LBS server device 225 can identify the coarse position of the user device 205 (e.g., using the (updated) base station almanac data structure) based on the match.

In this way, LBS server device 225 can identify, using the altered base station identifier, a coarse position of a user device based on a request for position information submitted by the user device.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

Although process 500 is generally described herein as involving actions or steps that are performed by an individual LBS server device 225, each of multiple LBS server devices 225 can perform the same or similar actions or steps.

Some implementations, described herein, provide a base station 210 (e.g., a base station device) that is capable of limiting or restricting the ability of a third-party provider of location-based services to determine (e.g., via analysis of crowdsourced PCIs) position information relating to base station 210, and thus limiting or restricting the ability of the third-party provider to leverage such position information for the third-party provider's own purposes without a network provider's permission. In some implementations, base station 210 can periodically alter the PCI of base station 210, which can deter a third-party provider's reliance on PCIs to determine coarse positions of serving base stations or cells.

In some implementations, the network provider's own location-based service server device (e.g., LBS server device 225) can include a base station almanac data structure (e.g., a file, a list, an array, a stack, a queue, a tree, and/or the like) that associates each of the network provider's base stations with a corresponding PCI, and can periodically update the base station almanac data structure in synchrony with PCI alterations performed by the base stations.

In this way, a network provider can maintain control of the network provider's PCIs, and utilize the PCIs for the network provider's own purposes, such as to facilitate the provision of the network provider's own location-based services, which permits the network provider to ensure that high quality location-based services are provided to users.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A base station device, comprising:
one or more processors configured to:
broadcast, in one or more messages, a base station identifier assigned to the base station device, the base station identifier having a value stored in a location-based service (LBS) server device;
process the base station identifier to generate an altered base station identifier for the base station device,
the base station identifier being processed by an operation that corresponds to an operation in which the LBS server device processes the value of the base station identifier, and
the base station identifier being processed at a time that corresponds to a time at which the LBS server device processes the value of the base station identifier; and
perform one or more actions to cause the altered base station identifier to be broadcasted,
the altered base station identifier being broadcasted in one or more additional messages that are receivable by user devices.

2. The base station device of claim 1, wherein the altered base station identifier matches a base station identifier value that is generated at one or more LBS server devices including the LBS server device.

3. The base station device of claim 1, wherein a timer is initiated for the base station identifier synchronously with the LBS server device initiating a timer.

4. The base station device of claim 1, wherein the base station identifier being processed using a first operation corresponds to a second operation associated with the LBS server device when processing the value of the base station identifier.

5. The base station device of claim 1, wherein the base station identifier includes a physical cell identifier, and
wherein the one or more processors, when processing the base station identifier to generate an altered base station identifier, are to:
process the base station identifier to generate the altered base station identifier by one or more of:
adding a value to the physical cell identifier,
subtracting a value from the physical cell identifier,
multiplying the physical cell identifier by a value, or
dividing the physical cell identifier by a value.

6. The base station device of claim 1, wherein the base station identifier includes a physical cell identifier, and
wherein the one or more processors, when processing the base station identifier to generate an altered base station identifier, are to:
process the base station identifier to generate the altered base station identifier; and
wherein the one or more processors are further to:
reinitiate a timer after processing the altered base station identifier.

7. The base station device of claim 1, wherein the one or more processors are further to:
perform at least one action to cause the altered base station identifier to be provided to the LBS server device to enable the LBS server device to provide one or more LBSs to user devices that are served by the base station device.

8. A non-transitory computer-readable medium storing instructions, the instructions comprising:
one or more instructions that, when executed by one or more processors of a base station device, cause the one or more processors to:
broadcast, in one or more messages, a base station identifier assigned to the base station device,
the base station identifier having a value stored in a location-based service (LBS) server device;
process the base station identifier to generate an altered base station identifier for the base station device, the base station identifier being processed at a time that corresponds to a time at which the LBS server device processes the value of the base station identifier; and perform one or more actions to cause the altered base station identifier to be broadcasted,
the altered base station identifier being broadcasted in one or more additional messages that are receivable by user devices.

9. The non-transitory computer-readable medium of claim 8, wherein the altered base station identifier matches a base station identifier value that is generated at one or more LBS server devices including the LBS server device.

10. The non-transitory computer-readable medium of claim 8, wherein:
the base station identifier includes a physical cell identifier associated with a first value, and
the altered base station identifier includes the physical cell identifier associated with a second value,
the second value being different than the first value.

11. The non-transitory computer-readable medium of claim 8, wherein the base station identifier being processed using a first operation corresponds to a second operation associated with the LBS server device when processing the value of the base station identifier.

12. The non-transitory computer-readable medium of claim 8, wherein the base station identifier is broadcasted in one or more messages that are receivable by the user devices.

13. The non-transitory computer-readable medium of claim 8, wherein the one or more instructions, that cause the one or more processors to broadcast the base station identifier, cause the one or more processors to:
broadcast a base station identifier in one or more system information block (SIB) messages.

14. The non-transitory computer-readable medium of claim 8, wherein a timer is initiated for the base station identifier synchronously with the LBS server device initiating a timer.

15. A method, comprising:
broadcasting, by a base station device, a base station identifier assigned to the base station device,
the base station identifier having a value stored in a location-based service (LBS) server device;
processing, by the base station device, the base station identifier to generate an altered base station identifier for the base station device,
the base station identifier being processed at a time that corresponds to a time at which the LBS server device processes the value of the base station identifier; and
performing, by the base station device, one or more actions to cause the altered base station identifier to be broadcasted,
the altered base station identifier being broadcasted in one or more additional messages that are receivable by user devices.

16. The method of claim 15, wherein a timer is initiated for the base station identifier synchronously with the LBS server device initiating a timer.

17. The method of claim 15, wherein:
the base station identifier includes a physical cell identifier associated with a first value, and
the altered base station identifier includes the physical cell identifier associated with a second value,
the second value being different than the first value.

18. The method of claim 15, wherein the base station identifier being processed using a first operation corresponds to a second operation associated with the LBS server device when processing the value of the base station identifier.

19. The method of claim 15, the base station identifier being broadcasted in one or more messages that are receivable by the user devices.

20. The method of claim 15, further comprising:
performing at least one action to cause the altered base station identifier to be provided to the LBS server device to enable the LBS server device to provide one or more location-based services to user devices that are served by the base station device.

\* \* \* \* \*